May 5, 1942.                M. FLEISCHER                2,282,045
                              VIEW FINDER
                        Filed March 11, 1940         3 Sheets-Sheet 1

INVENTOR
MAX FLEISCHER
BY Hornidge and Dowd
ATTORNEYS

May 5, 1942.  M. FLEISCHER  2,282,045

VIEW FINDER

Filed March 11, 1940   3 Sheets-Sheet 2

Fig. 4.

PRIOR ART.

INVENTOR
MAX FLEISCHER
BY Horridge and Dowd
ATTORNEYS

May 5, 1942.   M. FLEISCHER   2,282,045
VIEW FINDER
Filed March 11, 1940    3 Sheets-Sheet 3

INVENTOR
MAX FLEISCHER
BY Horridge and Dowd
ATTORNEYS

Patented May 5, 1942

2,282,045

UNITED STATES PATENT OFFICE 2,282,045

VIEW FINDER

Max Fleischer, Miami Beach, Fla.

Application March 11, 1940, Serial No. 323,445

40 Claims. (Cl. 95—44)

This application is a continuation in part of my co-pending application Serial No. 11,243, filed March 15, 1935, for Improvements in view finders.

In the taking of photographs and motion pictures it is desirable to ascertain what portion of the scene towards which the camera is directed will appear upon the sensitive film in the camera, and this is accomplished in some cases by the use of view-finders of well known types utilizing an independent lens positioned near the camera lens with or without means of adjustment to overcome the resulting parallax. In other types of motion picture cameras means are provided within the camera whereby the image projected by the lens of the camera may be viewed upon a ground glass occupying the equivalent position of the film upon which the photograph is to be taken and all of such means are often utilized also for the purpose of focusing the camera.

All such methods and devices however are open to many objections, one being due to the fact that the image of the scene thus obtained may be viewed by but one person at a time. For example, in the taking of motion pictures, after the camera man has positioned and adjusted his camera with the aid of such view finders so as to take in the particular portion of the set or scene desired, the director of the picture being taken makes his own observation and in many instances requires a change in the position or adjustment of the camera to accord with his own wishes, and with each of the innumerable changes of position of the camera the same procedure must be followed, resulting in material consumption of time and consequent expense. In photographing moving persons or objects in what is known in the motion picture art as follow-up shots, the adjustment of the camera to a constantly changing view is particularly laborious and subject to many errors and the necessity of frequent retakes of the scenes.

In addition no one other than the person or persons, camera man, director or others, who have actually viewed the scene through the usual finder mechanism of the camera knows the exact area of the scene being photographed which will register upon the frame of the film.

Great economy would be effected in the production of motion pictures if the camera man, directors and others interested in or responsible for the production of the picture were able to see at a glance and from positions removed from the camera the particular area or portion of a set or scene which will be registered through the camera lens upon the film with the camera in any position, not only because of the saving in time but thereby dispensing with the present methods which are largely those of trial and error.

According to the present invention I provide a method for accurately framing the scene to be photographed without the necessity of viewing the scene through the finder mechanism of the camera, whereby the camera man, director and all others taking part in the picture being photographed may at a glance see the exact area which conforms to the portion of the film exposed to the lens through the aperture plate of the camera, referred to herein as the frame of exposure of the film, in each position of the camera.

More specifically the present invention provides a method and apparatus to carry out the method of accurately framing the portion of the scene to be photographed by projecting a panel or area of illumination upon the scene to be photographed which will sharply illuminate that portion of the scene which corresponds to the frame of exposure of the film.

It will be understood that it is not the purpose of the present invention to provide a substitute for the usual focusing practices. Focusing in motion picture photography is best accomplished especially in studio work by accurate measurement of the distance of the subject from the camera and adjusting the camera lens according to the distance, means being provided for accomplishing this adjustment quickly and readily.

By means of the present invention the camera man, director and all others interested in the production of the picture will see at a glance a rectangular illuminated area which accurately conforms to the picture that will be registered through the lens of the camera upon the film, with all the advantages that follow therefrom.

Oftentimes in a stage setting there will be sections of scenery, properties, microphones, lighting cables, etc., which are not desirable to be included in the picture, and their presence in the field of the camera will be easily and immediately detected when the projected area of illumination reveals their presence within its borders and hence within the frame of exposure of the film.

In the carrying out of the invention I may make use of the camera itself and the focusing mechanism of the camera or I may provide a device to be attached to the camera. In any case as the camera is moved in any direction the projected frame of light moves with it providing an illuminated rectangular framing of the scene as registered through the lens of the camera upon the frame of exposure of the film.

Figures 1, 2, 3, 8:
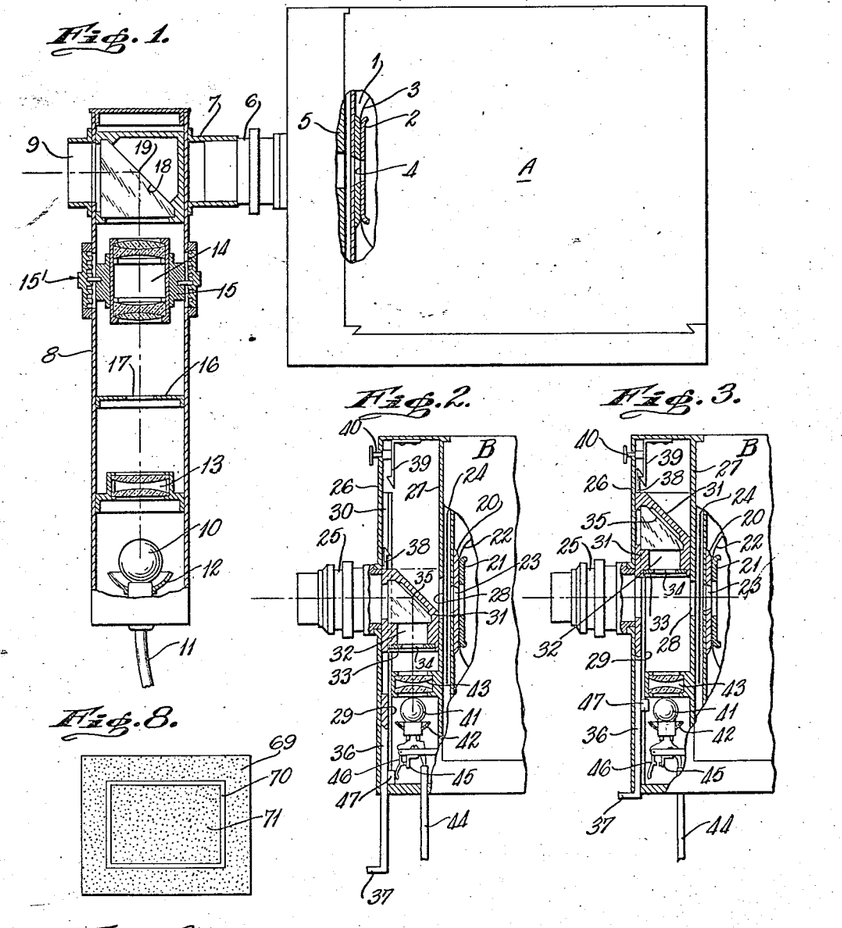
Fig. 1 is a side elevation with parts in section of one form of the invention attached to the lens barrel of a camera.
Fig. 2 is a side elevation with parts in section of a modified form of the invention located within the camera.
Fig. 3 is similar to Fig. 2 but showing a part of the device moved to a different position with respect to the lens of the camera.
Fig. 8 indicates the illumination upon the scene in the form of a band or border.

Referring to Fig. 1, A indicates a motion picture camera of conventional type, provided with an aperture plate 1 and a pressure plate 2 between which the film 3 is moved intermittently past the aperture 4 while a shutter 5 operates to allow the light from the lens which is movably mounted in the barrel 6 to fall upon the portion of the film exposed by the aperture 4 during the times the said film is at rest.

Removably attached at a right angle to the lens barrel 6 by a sleeve portion 7 is a housing 8 which together with the sleeve 7 may be of metal or other strong and rigid material impervious to light except through the aperture 9 which is disposed opposite the sleeve portion 7, has its center in the optical axis of the lens of the camera, and is of sufficient size not to obstruct the passage of any rays transmitted through lens 14 from the lamp 10 as hereinafter described. Situated within the housing 8 and towards the end away from the aperture 9 is fixed an electric lamp 10 which receives its current through the cable 11. 12 is a reflector positioned behind the lamp 10. 13 is a condenser adapted to collect the rays from the lamp 10 and reflector 12 and project them forward towards the lens 14. The lens 14 is of the same focal length as the camera lens in the barrel 6 and is mounted in the tubular support 15 which is slidably positioned within the walls of the housing 8 so that when the housing 8 is attached to the barrel 6 of the camera lens the optical axis of the lens 14 will intercept at right angles the optical axis of the said camera lens. Means for adjusting the lens 14 in accordance with the varying distance of the camera from the scene consist of a rotatable ring 15' having an internal thread engaging a pin in the support 15 protruding through a longitudinal slot in the housing 8. Situated in the housing 8 between the condenser 13 and the lens 14 and at a distance from the lens 14 equal to the focal length of said lens is a mask 16 of thin metal or other material having therein an aperture 17 of the same size and shape as the aperture 4. In the housing 8 and on the other side of the lens 14 from the mask 16 is fixed a prism whose reflecting face 18 is disposed at an angle of 45 degrees with respect to the plane of the lens 14 and is of sufficient size to reflect all light rays coming through said aperture 17 and projected by the lens 14. The reflecting face 18, the lens 14 and the mask 16 are so disposed that when the housing 8 is attached to the barrel 6 of the camera lens the distance from a point 19 on the reflecting face 18 to the plane of the mask 16 is the same as the distance from the said point 19 to the plane of the film 3 in the camera.

It will thus be seen that the rays of light from the lamp 10 passing through condenser 13, the aperture 17 of the mask 16 and the lens 14, strike the reflecting face 18 at an angle of 45 degrees by which they are reflected at the same angle on to the scene where they produce an area of illumination coextensive with the portion of the scene which will be registered upon the frame of exposure of the film when the housing 8 has been removed from the lens barrel of the camera and the camera operated in the ordinary way without changing its position. If a plane mirror is used instead of a prism the housing 8 may remain in place on the lens barrel 6 and the mirror may be dropped down clear of the camera lens so as to permit operation of the camera in photographing the scene. In this case, however, it will be obvious that a portion of the housing 8 adjacent the sleeve portion 7 will have to be cut away and the light from the scene permitted to enter the camera through the camera lens.

As camera A is moved the area of illumination on the scene moves with it and in every position of camera A the area of illumination accurately defines that portion of the scene which if photographed will register upon the film. It will be understood, of course, that the lens 14 is to be adjusted in accordance with the varying distance of the camera from the scene as is well known to those skilled in the art, and this will be true in all embodiments and practice of my invention except where the lens of the camera is of the so-called "fixed focus" type.

Referring to Figs. 2 and 3, B indicates a motion picture camera provided with an aperture plate 20 and a pressure plate 21 between which the film 22 is moved intermittently past the aperture 23 while a shutter 24 operates to allow the light from the lens contained in the lens barrel 25 to fall upon the portion of the film exposed by the aperture 23 during the times the said film is at rest. Intermediate the front wall 26 of the camera and the shutter 24 is an interior wall 27 extending from top to bottom and from side to side of the camera and having in it an aperture 28 in registry with the aperture 23. Upon the inner side of the front wall of the camera are two parallel upright guiding members forming with said wall channels or grooves which are disposed one on each side of the opening for the lens barrel 25. Portions of these guiding members and of the channels or grooves are indicated at 29 and 30 respectively. Positioned between the walls 26 and 27 and adapted to slide vertically between the guiding members 29 from a position opposite the lens in the barrel 25 and the aperture 28 as shown in Fig. 2 to a position clear of the said camera lens and the aperture 28 is the sliding member 31 having a vertical tubular portion 32 disposed at right angles to the lens barrel 25, and at the lower end of said tubular portion is fixed horizontally a thin mask 33 having therein an aperture 34 of the same size and shape as the aperture 23. Above said tubular portion and in said sliding member 31 there is rigidly fixed a prism of a size sufficient to reflect all light rays coming through said aperture and having its reflecting face 35 disposed at an angle of 45 degrees with respect to the plane of said mask 33 and at such a distance therefrom that when the sliding member is in the position shown in Fig. 2, a point 35 on said reflecting face will be equidistant from the plane of said mask 33 and from the plane of the film 22. The portion of said sliding member 31 above said tubular portion is cut away on the side thereof adjacent the front wall 26 of the camera to permit all light rays coming through said aperture 34 and reflected by said prism to fall upon the camera lens in the barrel 25 when said sliding member is in such position that the optical axis of said camera lens passes through the center of the mirror 35, as shown in Fig. 2. Attached to said sliding member 31 is the rod 36 extending through the bottom of the camera and bent at its lower end to form a handle 37 whereby the sliding member 31 may be moved from its position as shown in Fig. 2 to its position above and out of the field of the camera lens as shown in Fig. 3. Attached to the upper portion of the sliding member 31 is the spring latch member 38 adapted to engage with a similar spring latch member 39 attached to the underside of the top of the camera whereby said sliding member is prevented from movement back into the position shown in Fig. 2 until the latch members 38 and 39 are disengaged by pressure upon the pin 40 the inner end of which engages the spring portion of the upper latch member 39. Situated at the lower portion of the space between the front wall 26 and the interior wall 27 of the camera is an electric lamp 41 provided with a reflector 42. 43 is a condenser adapted to collect the rays from the lamp 41 and reflector 42 and project them upwards through the aperture 34. Said lamp, reflector and condenser are so enclosed as to prevent the light from the lamp and condenser 41 from passing elsewhere than through the aperture 34 in the mask 33 when the sliding member is in the position shown in Fig. 2. Current to supply the lamp 41 is provided through a cable 44 consisting of two wires one of which is attached to a stationary contact member 45. The other terminal of said lamp is connected to the spring contact member 46 which is normally out of contact with the member 45. Attached to the rod 36 is a block 47 composed of fibre or other non-conductive material and so placed that when the rod 36 is pulled down so as to bring the sliding member 31 into the position shown in Fig. 2 the block 47 will engage the spring contact member 46 and force it into contact with the stationary contact member 45 thus completing the circuit and lighting the lamp 41. When the rod 36 is pushed upwards to move the sliding member 31 into the position shown in Fig. 3 the block 47 will pass beyond and release the spring contact member 46 which will spring out of contact, break the circuit and extinguish the lamp 41.

It will thus be seen that when the sliding member 31 has been pulled down by the rod 36 to the position shown in Fig. 2 the lamp 41 is lighted and the rays therefrom passing through the condenser 43 and the aperture 34 of the mask 33 strike the reflecting surface 35 at an angle of 45 degrees by which they are reflected at the same angle and are projected by the lens of the camera in barrel 25 on to the scene where they produce an area of illuminaton co-extensive with the portion of the scene which will be registered upon the film 22 when the sliding member 31 has been moved by the rod 36 to the position shown in Figure 3 whereby the lamp 41 has been extinguished and the light rays from the camera lens in the barrel 25 are given free and unobstructed passage through the aperture 23 to the film 22. With the sliding member 31 in the position shown in Figure 2 and the camera pointed towards the scene to be photographed, both the camera man and others interested in the photography of the scene may readily determine from the area of illumination projected upon the scene just what portion thereof will be registered on the film during the photography and thus readily select and determine, as the camera is moved about into various positions with respect to the scene, the portion of the scene to be photographed. When this has been determined a push upwards of the rod 36, whereby the sliding member 31 is moved into the position shown in Figure 3, enables the operator to photograph the portion of the scene previously determined as aforesaid. It will be noted that in the projection of the area of illumination upon the scene as aforesaid the lens of the camera in the barrel 25 is to be adjusted in the usual way to the position required by the distance of the camera from the scene, as will be obvious to those skilled in the art.

Figure 4:
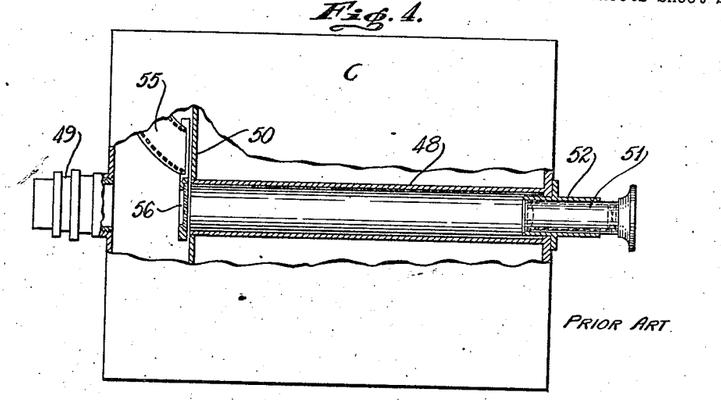
Fig. 4 is a top plan view with parts in section of a well-known type of motion picture camera.
Figure 5:
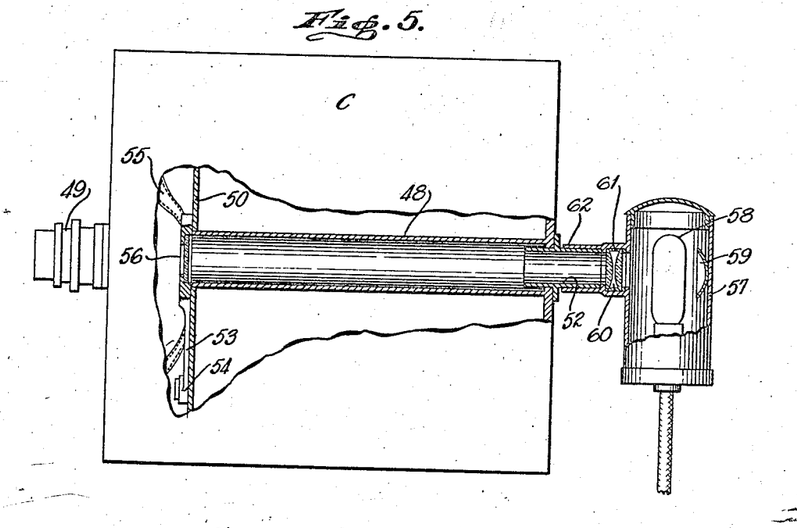
Fig. 5 is a side elevation with parts in section of the camera shown in Fig. 1 equipped with a modified form of the invention.

Referring to Figures 4 and 5, C represents a camera of well-known make equipped with a focusing tube 48, the longitudinal axis of which coincides with the axis of the lens of the camera in barrel 49. This focusing tube 48 is attached at its front end to an interior wall 50 of the camera immediately behind the portion of the film in position for exposure behind the aperture. At the rear of said focusing tube 48 and extending outward from the rear of the camera is an eyepiece 51 which is slidably mounted in the tube 52, whereby the image registered by the camera lens in the barrel 49 upon said film may be readily viewed through the back of said film or upon a ground glass positioned in an aperture of the same size and shape as the aperture of the film which may be readily substituted in the place of the film and its aperture. This camera contains within it a member 53 pivotally mounted upon the front side of the intermediate wall 50 as at 54, and carries the film 55 and its aperture (not shown). In said member 53 and adjacent said film and its aperture there is another aperture 56 of the same size and shape as the film aperture in which is ordinarily positioned a pane of ground glass. By these means the operator of the camera can readily and at will move into position behind the camera lens either the film and its aperture or the ground glass aperture. When it is desired to focus this camera the aperture 56 containing the ground glass is moved into position behind the lens and in front of the focusing tube 48 and the camera shutter (not shown) is turned to and held in the open position. The image projected on the ground glass by the lens in the barrel 49 may then be viewed through the eyepiece 51. When the operator of the camera has adjusted this lens to the desired focus and is ready to begin photographing the pivoted member 53 is moved around so as to bring the film and its aperture into the position behind the camera lens previously occupied by the ground glass aperture and the eyepiece is covered or other means used to exclude light falling upon the back of the film. Sometimes the camera operator utilizes the eyepiece and focusing tube to view the image on the back of the film while it is moving past its aperture during photographing. Such details of said construction permitting the positioning at will of either the film with its aperture or the ground glass with its aperture behind the lens as are not shown, are omitted because this type of camera is well known to those familiar with this art and such details are unimportant so far as my invention is concerned.

My invention may be readily adapted for use in connection with the said camera shown in Figures 4 and 5 by removing the eyepiece 51 from its tube 52 and substituting the lamp and condenser arrangement shown in Fig. 5 in which 57 is a housing in which is positioned an electric lamp 58 behind which is a reflector 59 and in front of which is a condenser 60 mounted in a tubular member 61 which is extended to form a sleeve 62 which will snugly fit over the tube 52 in which the eyepiece 51 had been positioned. The ground glass aperture 56 is then brought into position behind the camera lens and the ground glass may preferably be removed in order to increase the amount of light which will pass through said aperture 56. When the lamp 58 is lighted the light therefrom and from the reflector will be projected along the interior of the focusing tube 48, and in the form defined by the aperture 56 will be projected by the camera lens in the barrel 49 upon the scene as an area of illumination coextensive with that portion of the scene which will be registered upon the frame of exposure of the film in the camera when the said film and its aperture has been moved into position behind the camera lens as aforesaid.

It is to be noted also in connection with the camera shown in Figs. 4 and 5 that it is unnecessary for the photographic operation to remove the said lamp reflector condenser and housing from the focusing tube 52, but the same may be permanently attached to the tube 52, if it is so desired, the only thing necessary being to extinguish the light during the photographing operation.

Figure 6:
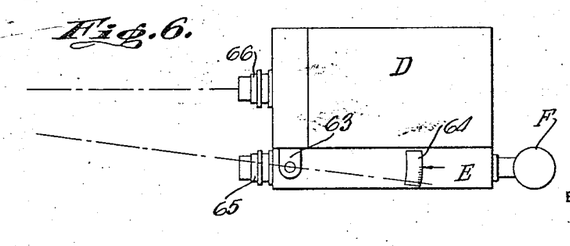
Fig. 6 is a diagrammatic plan view of a camera equipped with a separate focusing device and showing the invention adapted thereto.

In Fig. 6 I have shown how my invention may be adapted to the type of motion picture camera which makes use of an independent focusing tube mounted alongside the camera and having means to eliminate parallax. In Fig. 6, D represents a type of motion picture camera on the side of which is mounted a focusing tube E. The focusing tube E is attached to the camera D by pivotal means at or towards the front of the camera as at 63, by which it may be swung to an extent in accordance with a scale indicated at 64 to overcome the effect of parallax at various distances of the camera from the scene to be photographed.

In cameras of this type the focusing tube E is equipped at its forward end with a lens 65 having the same focal length as the camera lens 66 and is mounted in the same plane therewith. In the focusing tube E and behind lens 65 there is mounted a mask having therein an aperture of the same size and shape as the film aperture in the camera D, both positioned in the same plane and at a distance behind their respective lenses equal to the focal length of said lenses.

The mask and aperture in the focusing tube E and the film aperture in the camera D are not shown since their existence, construction and position are well known to those experienced in the art.

The focusing tube E is usually provided with an eye-piece similar to 51 in Fig. 4, and in Fig. 6 this eyepiece has been removed, and the lamp 58, reflector 59, condenser 60 and housing 57 of Fig. 5 is attached to the focusing tube E in its place by means for example such as sleeve 62 of Fig. 5 or other convenient means.

F indicates the said lamp, reflector, condenser and their housing as attached to the rear end of the focusing tube E. With this arrangement, as shown in Fig. 6, when the focusing tube E has been swung into position in accordance with the scale 64 so as to correct for parallax between the lenses 65 and 66 with respect to the scene, it will be readily understood from what I have already herein shown and described that the light proceeding from F along the interior of the focusing tube E will in the form defined by the aforesaid aperture located within the focusing tube E be projected by the lens 65 upon the scene as an area of illumination coextensive with that portion of the scene which will be registered by the lens 66 upon the frame of exposure of the film in the camera D.

Figure 7:
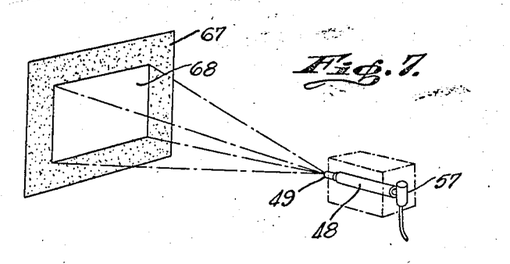
Fig. 7 is a diagrammatic view showing illumination of the portion of a screen to be registered by the lens of the camera upon the film.

In Fig. 7, 67 indicates a scene represented, in this instance for example, as a flat surface and 68 is the portion of the scene upon which there is projected the area of llumination in accordance with my invention when the same is used in connection with a camera such as is shown for example in Figs. 4 and 5, the eyepiece 51 having been removed and the lamp 58, reflector 50, condenser 60 and housing 57 of Fig. 5 being substituted in its place. The portion 68 of the said scene so illuminated is the portion which will be registered upon the frame of exposure of the film in the camera during the photography.

It will be noted that the same illumination of a portion of the scene will be obtained by the other forms of my invention hereinbefore shown and described.

In Fig. 8, 69 indicates a scene represented as in Fig. 7, also as a flat surface, and 70 is a band or border of illumination projected upon the scene, the outer edge of which bounds and defines in accordance with my invention the portion of the scene which will be registered upon the frame of exposure of the film in the camera. This band or border 70 is produced by covering the interior area of the apertures 17 in Fig. 1, 34 in Figs. 2 and 3, 56 in Figs. 4 and 5 and the aperture referred to in the focusing tube E of Fig. 6, with an opaque mask of the same shape as said apertures but slightly less in area so as to permit the passage of a thin line of light between the edges of said mask and the adjacent edges of said apertures. This may be accomplished in any well-known way such as for instance by inserting in the aperture a pane of transparent Celluloid or glass upon which the said mask has been painted with opaque paint. 71 indicates the unilluminated portion of the scene resulting from masking the aperture in this way.

It will of course be understood that the light projected on the scene in accordance with my invention must be of sufficient intensity to constitute an area of illumination visibly distinct from the general lighting of the scene, and where the scene is an interior one it is advisable in practising my invention that the general lighting of the scene be substantially reduced so that the projected area of illumination will stand out sharply. In this connection a control of the general lighting of the scene may be arranged so that at the instant the area of illumination is projected upon the scene the general lighting may be dimmed or extinguished, said control being made readily accessible to the operator of the camera.

In the use of my invention and where the general illumination of the scene may be controlled, it will sometimes be found desirable to have the general illumination consist of light of one color and the projected area of illumination consist of light of another color.

In the above described embodiments of my invention where a separate lens is used for projecting an area of illumination, such for instance as is shown in Figs. 1 and 6, the said projecting lens is described as being of the same focal length as that of the lens of the camera, the diaphragm being positioned at a distance from the projecting lens equal to the focal length of said lens when in focus on the scene, and the projecting lens being positioned optically the same distance from the scene as the camera lens. Both lenses being thus matched, any movement of the view finder lens to and away from the diaphragm to accommodate it for different distances from the scene will be accompanied by a similar extent of movement of the camera lens to focus it, so that both lenses will continue to be the same distance from the scene.

As the result of experiment I find, however, that if both lenses are not of the same focal length, the area of illumination may be made to coincide with the area of the scene registered on the film in the camera, by altering, as hereinafter described, the size of the aperture in the diaphragm of the view finder to produce such coincidence, but ordinarily this condition will obtain only at one distance of both lenses from the scene. In other words, if by making the aperture in the diaphragm of the view finder of a size that will produce such coincidence when both lenses are focussed for a scene at a distance of say one hundred feet away, then to accommodate both the camera lens and the view finder lens for a scene at a shorter distance away, for example, ten feet, the distance of the camera lens and the view finder lens from the film and aperture, respectively, will have to be increased, which in the usual type of camera is accomplished by moving the lens a certain distance towards the scene, ordinarily by turning the lens barrel in its usual spiral thread mount. The extent of such movement, however, varies for lenses of different focal lengths—the longer the focal length of the lens the greater the extent of movement of the lens to focus it for different distances, so that with a view finder lens of a different focal length than that of the camera lens any focusing adjustments of the two lenses will result in them being at different distances from the scene and hence there will be a discrepancy between the area of the scene defined by the view finder and the area registered on the frame of exposure of the film in the camera. The extent of this discrepancy will increase with the amount of difference between the focal lengths of the two lenses and also with the nearness of the lens to the scene, the extent of movement of the lenses being far greater for an adjustment of focus, for instance, for a change of distance from ten feet to four feet than it would be for change from fifty feet to twenty-five feet. This discrepancy due to use of lenses of different focal length may be avoided in the following way.

Figures 9, 10:
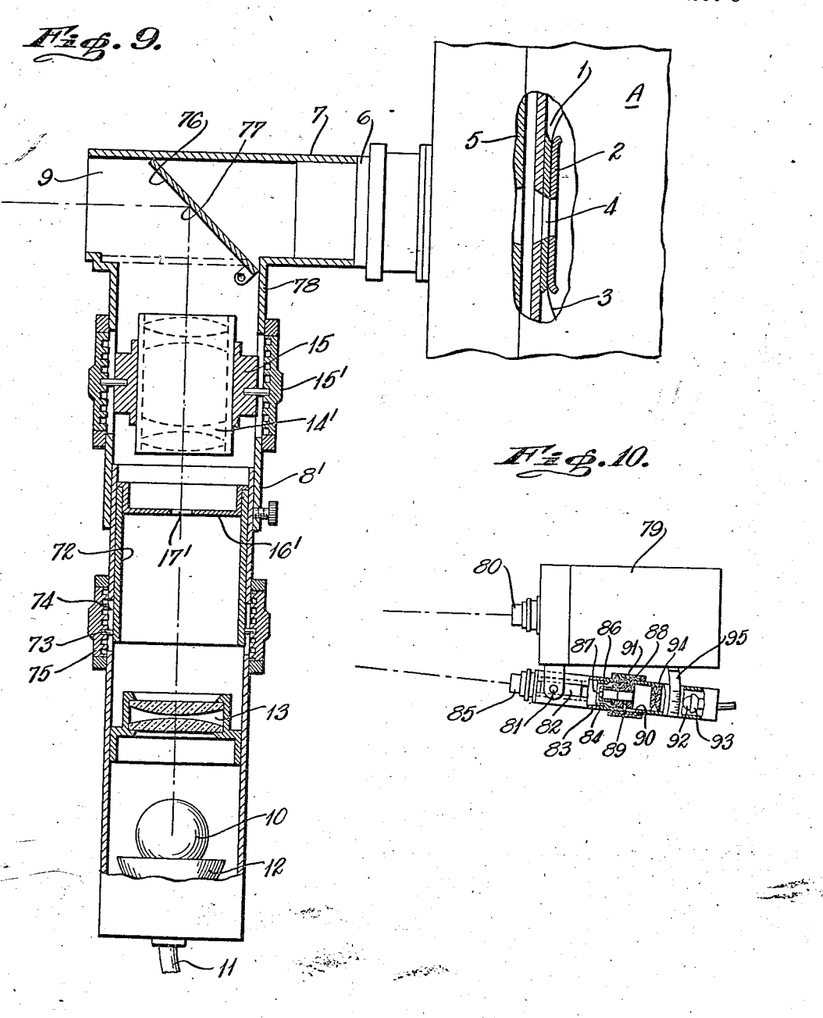
Fig. 9 is a side elevation with parts in section of a modified form of the invention shown in Fig. 1.
Fig. 10 is a plan view with parts in section of another form of the invention attached to the side of a camera.

Referring to Fig. 9, in which the same reference numerals as in Fig. 1 are used to indicate similar parts, A indicates a motion picture camera of conventional type provided with an aperture plate 1 and a pressure plate 2 between which the film is moved intermittently and past the aperture 4 while a shutter 5 operates to allow the light from the camera lens which is movably mounted for focusing purposes in the barrel 6 to fall upon the portion of the film exposed by the aperture 4 during the times the said film is at rest. The said camera lens for purposes of illustration is one having an optical length of 4 inches.

Removably attached at a right angle to the lens barrel 6 by a sleeve portion 7 is a cylindrical housing 8 which together with the sleeve 7 may be of metal or other strong and rigid material impervious to light except through the aperture 9 which is disposed opposite the sleeve portion 7, has its center in the optical axis of the camera lens and is of sufficient size not to obstruct the passage of any rays transmitted through the lens $14^1$ from the lamp 10 as hereinafter described. The housing 8 is preferably made in two parts adapted to slide one within the other and held in any desired relative position by a set screw as at $8^1$. Situated within the housing 8 and towards the end away from the aperture 9 is fixed an electric lamp 10 which receives its current through the cable 11. 12 is a reflector positioned behind the lamp 10. 13 is a condenser adapted to collect the rays from the lamp 10 and reflector 12 and project them towards the lens $14^1$. The lens $14^1$ is of a different focal length than that of the camera lens in the barrel 6, for example, of a focal length of two inches, and is mounted in the tubular support 15 which is slidably positioned within the walls of the housing 8 so that when the housing 8 is attached to the barrel 6 of the camera lens, the optical axis of the lens $14^1$ will intercept at right angles the optical axis of the said camera lens. Means for adjusting the lens $14^1$ in accordance with the varying distance of the camera from the scene consist of the rotatable ring $15^1$ having an internal thread engaging a pin in the support 15 protruding through a longitudinal slot in the housing 8. Situated in the housing 8 between the condenser 13 and the lens $14^1$ is a mask $16^1$ of thin metal or other material having therein an aperture $17^1$ similar in shape to the aperture 4. The mask $16^1$ is mounted in a tubular support 72 provided with a pin 73 protruding through a longitudinal slot 74 in the housing 8 where it is engaged by the internal threads of a rotatable ring 75 whereby the position of the mask $16^1$ may be critically adjusted to or away from the lens $14^1$, in addition to the broader adjustment provided for by sliding the two parts of the housing 8 one within the other. The area of the aperture $17^1$ in the mask $16^1$ is substantially one-quarter that of the aperture 4. By taking apart the two sections of the housing 8 the mask $16^1$ with its support 70 may be removed and another one with a different size aperture substituted for it.

In the housing 8 and on the other side of the lens $14^1$ is fixed a mirror whose reflecting face 76 is disposed at an angle of 45 degrees with respect to the plane of the lens 14¹ and is of sufficient size to reflect all light rays coming through said aperture 9 and projected by the lens 14¹. The reflecting face 76 and the lens 14¹ are so arranged that when the housing 8 is attached to the barrel 6 of the camera lens, the distance from a point 77 on the reflecting face 76 to the nodal point of the lens 14¹ may, by adjusting the position of the lens 14¹, be always made the same as the distance from the said point 77 to the nodal point of the camera lens in the barrel 6 when focused upon the scene, so that both lenses are at the same optical distance from the scene. The said mirror is hinged as at 78 and may be dropped down clear of the camera lens so as to permit operation of the camera in photographing the scene.

It will thus be seen that with the camera lens focused upon a given scene and the lens 14¹ adjusted to a position where the respective distances from the point 77 on the reflecting face 76 of the mirror to the nodal points of the lens 14¹ and of the camera lens are equal, and with the mask 16¹ adjusted to a position where it is in sharp focus with respect to said scene, the rays of light from the lamp 10 passing through condenser 13, the aperture 17¹, and the lens 14¹ strike the reflecting surface 76 at an angle of 45 degrees and are reflected at the same angle along the optical axis of the camera lens on to the scene where they produce an area of illumination coextensive with the portion of the scene which will be registered upon the frame of exposure of the film in the camera when the said mirror has been dropped down and the camera operated in the usual way without changing its position. In determining the size of the aperture for shaping the illuminating beam to be projected to the scene by a lens of a different focal length than that of the camera lens, I find that it must have the same shape as the frame of exposure of the film in the camera and that its size will vary proportionately with the difference between the focal lengths of the view finder lens and the camera lens. For example, with a camera having a lens of four inch focal length and a rectangular frame of exposure of one inch wide by three quarters of an inch high, or an area of three quarters of a square inch, and the view finder lens having a two inch focal length or one-half that of the camera lens, the dimensions of the aperture 19 should be one-half of those of the said frame of exposure, or one-half inch wide by three eighths of an inch high, or an area of three-sixteenths of a square inch. This correspondence between the area of illumination and the portion of the scene registered on the film in the camera will obtain throughout any varying distances of the camera from the scene provided the view finder lens is maintained at the same distance from the scene as the camera lens. Although for different distances of the camera from the scene, the distance of the film from the camera lens and the distance of the view finder lens 14¹ from the aperture 17¹ will vary with the adjustments required for sharp focus, these distances will vary proportionately to the respective focal lengths of said lenses. For example, in the illustration given, if the distance from the lens in the barrel 6 to the film 3 has to be increased a quarter of an inch to focus the lens on a scene nearer by, the distance between the lens 14¹ and the aperture 17¹ will be increased one eighth of an inch to focus the illuminated aperture 17¹ upon the said scene, and the area of illumination projected on the scene will coincide with the frame of exposure of the film 3, the angles of view of the view finder and of the camera being equal when both lenses are focused upon scenes at different distances away.

As above stated the two lenses must for accuracy be maintained at the same distance from the scene. If, however, when utilizing the device of Fig. 9, the focusing adjustments necessary to accommodate both the camera lens and the view finder lens to a scene at a different distance away are made wholly by moving the said lenses to or away from the film 3 and the mask 16¹ respectively, the lenses then will be no longer at the same distance from the scene and the area of illumination on the scene and the portion of the scene which will be registered on the film in the camera will not coincide but the area of illumination will be slightly smaller or larger caused by the fact that the lens 14¹ has been moved farther away from or closer to the scene than the camera lens. In photographing scenes close to the camera, such as within ten feet or when photographing a stage setting composed of miniature objects, such an error or lack of coincidence may be very important but when the field of view is substantially great such as a full size moving picture stage the discrepancy might be ignored or allowed for by the operator of the camera, since with the change of position of the lenses of two inch and four inch focal lengths respectively, when focused at infinity and with their nodal points at the same distance from the point 75, to positions where they are adjusted to focus upon a scene thirty feet away, the effect of the difference between their respective distances from the scene would amount to a discrepancy between the edges of the area of illumination and of the portion of the scene registered on the film of not more than a fraction of an inch.

It will be observed that if the camera lens in the barrel 6 is changed to one of different focal length the mask 16¹ in the housing 8 may be readily changed to one having an aperture the size of which can be computed as hereinabove explained on the basis of the relative focal lengths of the camera lens and the view finder lens.

Fig. 10 shows a modified form of my invention in which the illuminated view finder is attached to the side of the camera and the projected area of illumination is directed in a straight line towards the scene to be defined so as to fall upon it on the optical axis of the camera.

79 is a motion picture camera of conventional type provided with a lens 80. Said lens has a focal length of, for example, four inches and is adjustable for focusing purposes. Pivotally mounted on one side of the camera body by a hinge 81 attached thereto adjacent the front of the camera is a track 82. Slidably mounted on said track is a tubular housing 83 formed in two sections connected together by a threaded joint as at 84. Said housing is provided at its front end with a lens 85 which has a focal length of, for example, two inches, and is adjustable forwardly and back in the conventional helical thread mounting for focusing purposes. Located in said housing at the focal plane of the lens 85 is a mask 86 having therein an aperture 87 of the same shape as the film aperture in the camera 79, which is similar to the aperture 4 in the camera shown in Fig. 9. The mask 86 is mounted in a tubular support 88 provided with a pin 89 protruding through a longitudinal slot 90 in the housing 83 where it is engaged by the internal threads of a rotatable ring 91 whereby the position of the mask 86 may be adjusted to or away from the lens 85. The slot 90 is continued through the threaded portion so that when the two sections of the housing 83 are taken apart, the mask 86 with its support 88 may be removed and another one with a different size aperture substituted for it, the threaded joint 84 being conveniently located adjacent thereto. The lamp 92, the reflector 93 and the condenser 94 provide the illuminating means whereby light is directed towards the aperture 87 and projected upon the scene. By means of the hinge 81, the housing 83 may be swung to an extent in accordance with a scale 95 to overcome the effects of parallax at various distances of the camera from the scene to be photographed so that the projected area of illumination will fall upon the scene on the optical axis of the camera and the track 82 permits a longitudinal movement of the housing 83 so that the lens 85 may be maintained at the same distance from the scene as the camera lens 80 when both lenses are focused upon the scene to be viewed and photographed respectively.

In operation the device of Fig. 10 is similar in all essential respects to that of Fig. 9 and the size of the aperture 87 is determined in the same way according to the relative focal lengths of the lens 80 and the lens 85. With the proper aperture 87 thus chosen, the camera lens 80 is focused upon the scene to be photographed in accordance with its distance from the camera and the illuminated image of the aperture 87 is focused by the adjustment of the lens 85 upon the said scene, the housing 83 being swung outwardly the proper distance indicated on the scale 95 so that the optical axes of the lens 80 and the lens 85 will intersect each other at the scene upon which the camera has been focused. The housing 83 is then moved along the track to a position where the nodal point of the lens 85 is in substantially the same plane with that of lens 80. As result of these steps, the area of illumination projected upon the scene will coincide with the portion of the scene which will be registered upon the film in the camera. This condition will obtain at all distances from the scene to be photographed, provided, when both lens have been focused, the lens 85 is brought into substantially the same plane as that of lens 80. Whenever it is desired to change the lens 80 to one of a different focal length, it is only necessary to change the mask 86 to one of a different and proper aperture and operate the device in the manner already described.

It is to be understood that my invention is in no wise restricted to the embodiments illustrated or referred to, but that modifications may be made without departing from the spirit or sacrificing any of the advantages of this invention.

What I claim is:

1. The method of defining upon a scene to be photographed by a camera upon a photographic film therein the portion of said scene corresponding to the frame of exposure of said film, comprising directing a beam of light towards the focal plane of a photographic lens having a focal length selected for the exposure of said film, shaping said beam at the focal plane of said lens to a size and shape equal to the frame of exposure of said film and projecting said shaped beam by said lens upon said scene, the plane of shaping of said beam being located at a distance from the scene as measured along said beam, equal to the distance of the frame of exposure of said film from the scene, and said shaped beam falling upon said scene in a direction along the optical axis of the camera.

2. A method of defining upon a scene to be photographed by a camera upon a photographic film therein the portion of said scene corresponding to the frame of exposure of said film, comprising directing a beam of light towards a photographic lens having a focal length selected for the exposure of said film, shaping said beam at the focal plane of said lens to a size and shape equal to the frame of exposure of said film, projecting said shaped beam by said lens and reflecting it upon the said scene along the optical axis of the camera, the plane of shaping of said beam being located at a distance from the scene as measured along said beam, equal to the distance of the frame of exposure of said film from said scene.

3. A method of defining upon a scene to be photographed by a camera upon a photographic film therein the portion of said scene corresponding to the frame of exposure of said film, comprising shaping a beam of light at the plane of exposure of said film to conform said beam to the shape and size of the said frame of exposure and projecting said shaped beam by the camera lens upon said scene.

4. A device of the class described including a photographic lens having a focal length selected for the exposure of a photographic film in a camera, an aperture having a size and shape equal to the frame of exposure of said film, a light source, said aperture being located in the focal plane of said lens and between said lens and light source, and means for so positioning said device with respect to the camera that the illumination projected by said lens will fall upon the portion of a scene corresponding to the frame of exposure of said film.

5. The combination with a camera of a housing containing therein a light source, an independent lens having the same focal length as the camera lens, an aperture located between said independent lens and said light source and in the focal plane of said lens, said aperture having a size and shape equal to the frame of exposure of the photographic film in the camera, a reflecting surface open to the outside of said housing located on the opposite side of said independent lens from said aperture and in line with but at an angle to the plane of said lens and said aperture, said housing being positioned with respect to said camera that the axes of the lens of said camera and of said independent lens intersect each other at a point in the center of said reflecting surface equidistant perpendicularly from the plane of said film and the plane of said aperture.

6. In a motion picture camera, a lens, an aperture located in the plane of said lens and having a sensitive film positioned immediately behind it, a second aperture of the size and shape of the first mentioned aperture and located in the same plane therewith, both of said apertures being movable laterally and alternately into position in registry with said lens, a tube so positioned that its longitudinal axis coincides with the optical axis of the said lens and extending rearwardly from the plane of said apertures and a light source at the rear of said tube whereby light is projected along the inside of said tube towards the plane of said apertures.

7. In combination with a motion picture camera, a tube extending alongside said camera containing in its front end a lens of the same focal length as the lens of the camera, an aperture of the same size and shape as the frame of exposure of the photographic film in the camera and positioned in said tube in the focal plane of said first mentioned lens, a light source at the rear of said tube whereby light is projected along the inside of said tube towards and through said aperture, and means for adjusting the position of said tube with respect to the camera so that the optical axes of both of said lenses will meet at a selected point in the scene to be photographed.

8. The method of defining upon a scene to be photographed an area thereof corresponding to the framed exposure area of a film contained within a camera, comprising shaping, at a given plane, a beam of light to have the same size and shape as the framed exposure area of the film and directing said shaped beam through a lens and projecting it on to the scene so that it falls thereon on the optical axis of the camera, the plane of beam shaping being spaced from the scene a distance measured along said beam equal to the distance between said scene and the framed exposure area, and said lens being spaced from the beam shaping plane, a distance equal to the focal distance of said lens.

9. The method of view finding with a camera having a definite field of vision for a definite focus which comprises propagating and projecting a beam of light, shaping the margins of said beam to make them correspond to the margins of said field of vision, and directing said shaped beam upon the scene to be photographed substantially along the optical axis of the camera to illuminate the scene within the field of vision of the camera, thereby to define the same.

10. The method of view finding with a camera having a definite field of vision for a definite focus which comprises providing a beam of light having a cross-sectional area corresponding to the cross-sectional area of the field of vision of the camera when focused on the scene, projecting said beam of light substantially along the optical axis of the camera, and thereby defining by illumination, the field of vision of the camera.

11. The combination with a camera of a housing containing therein a light source, an independent lens having the same focal length as the camera lens, an aperture located between said independent lens and said light source and in the focal plane of said lens, said aperture having a size and shape equal to the frame of exposure of the photographic film in the camera, a reflecting surface open to the outside of said housing located on the opposite side of said independent lens from said aperture and in line with but at an angle to the plane of said lens and said aperture, said housing being positioned with respect to said camera that the axes of the lens of said camera and of said independent lens intersect each other at a point in the center of said reflecting surface equidistant perpendicularly from the plane of said film and the plane of said aperture, and means for selectively passing the light from the outside of said housing through the lens of said camera.

12. In combination with a camera having image forming means of predetermined focal length, an apparatus supported by the camera in predetermined relation with respect thereto for defining upon a scene to be photographed the area of the scene which will be visioned by the optical system of said camera and included within the framed exposure area of the camera film when the image forming means is adjusted to bring said exposure area in focus with said scene, said apparatus comprising means for projecting a beam of light toward and along the optical axis of the camera, an objective lens system in the path of projection of said beam and through which said beam is projected toward said scene, said lens system having a focal length equal to the aforesaid focal length, a mask in the path of projection of said beam behind said lens system and having an opening therein equal in size and outline to said framed exposure area of the film in the camera, said mask opening serving to shape the beam at the plane of the mask to equal the shape of the exposure area, and means for adjusting the spacing of the mask behind said lens system to equal the spacing of the framed exposure area behind the image forming means of the camera when the latter is in focus with said scene.

13. The method of defining upon a scene to be photographed the area of the scene which will be visioned by the optical system of a camera and included within the framed exposure area of the camera film when the camera lens is adjusted to bring said exposure area in focus with said scene, said method comprising projecting a beam of light toward said scene through a lens system having a focal length equal to the focal length of the camera lens, shaping the margins of said beam to make the beam in the plane of shaping equal in size and outline to said framed exposure area of the film, and adjusting the spacing of said lens system with respect to the plane of shaping to make the distance therebetween equal to the distance between the framed exposure area of the film and the camera lens.

14. The method of defining upon a scene to the photographed the area of the scene which will be visioned by the optical system of a camera and included within the framed exposure area of the camera film when the camera lens is adjusted to bring said exposure area in focus with said scene, said method comprising projecting an image having a marginal outline equal in size and shape to the margins of said framed exposure area toward said scene through an objective lens system having the same focal length as the camera lens, and adjusting the distance between said image and said objective lens system to equal the distance between the framed exposure area of the film and the camera lens when the latter is in focus, whereby an illuminated image having the same marginal outline as the framed exposure area is projected in sharp focus upon the scene to define sharply the area thereof which will be included within the framed exposure area of the camera film.

15. The method of determining that portion of a scene to be photographed which will be included within the framed exposure area of a camera having a lens of predetermined focal length, said method comprising projecting a brightly illuminated image having an outline equal in size and shape to the outline of said framed exposure area of the camera film through an objective lens system having the same focal length as the camera lens system, and focusing the projected image upon the scene to be photographed.

16. The combination with a camera, of an apparatus for determining that portion of a scene to be photographed which will be included within the framed exposure area of a film in the camera, said apparatus comprising an objective lens system having the same focal length as the camera lens, means for projecting an image toward and along the optical axis of the camera and through said lens system toward the scene to be photographed, means for defining the margins of said image to make them equal to the margins of the framed exposure area of the camera film, means for focusing said image upon the scene to be photographed, said means comprising means for varying the distance between said lens system and said image, and means for rendering the image projecting means ineffective prior to the exposure of the film in the camera during a photographing operation.

17. The method of defining upon a scene to be photographed the area of the scene which will be included in accurate focus within the framed exposure area of a film contained within a camera having a lens of predetermined focal length, said method comprising providing a lens system having the same focal length as the camera lens, creating behind the lens system a brightly illuminated image equal in outline to said framed exposure area of the film in the camera, equalizing the distance between said lens system and said image with the distance between the camera lens and the framed exposure area to bring the image and the scene into focus, and, while said lens system is so focused, projecting the image on to the scene, the margins of the projected image being in sharp focus on the scene and serving to define with clear outlines the portion of the scene which will be included within the framed exposure area of the film in the camera.

18. A view finder comprising means for defining upon a scene to be photographed the portion of the scene which will be visioned by the optical system of a camera having a lens of predetermined length and which will be included in accurate focus within the framed exposure area of the camera film, said means comprising means for creating an image equal in outline to the framed exposure area of the film, means for projecting said image toward the optical axis of the camera lens, a mirror surface disposed across and at an angle to said axis and to the line of projection of the image and positioned to reflect the projected image along the optical axis of the camera toward the scene, an objective lens system in the line of projection of said image having a focal length equal to the focal length of the camera lens, and means for adjusting said objective lens system along the line of image projection toward and from the image to bring said image and said scene into accurate focus, said mirror surface being removable from the optical axis of the camera prior to photographing.

19. A view finder comprising means for defining upon the scene to be photographed the portion of the scene which will be visioned by the optical system of a camera having a lens of predetermined focal length and which will be included in accurate focus within the framed exposure area of the camera film, said means comprising a mirror removably positioned in front of the camera lens with its center on the optical axis of the camera lens and with its reflecting surface positioned at an oblique angle with respect thereto, a mask spaced from said mirror having an opening therein equal in size and outline to the framed exposure area of the film in the camera, illuminating means behind said mask adapted to cooperate with the mask to project toward said mirror an image equal in outline to the framed exposure area of the film in the camera, said mirror serving to project the image along the optical axis of the camera lens toward said scene, a lens system between said mask and said mirror having a focal length equal to the focal length of the camera lens, and means for moving said lens system to bring the image of the mask opening and the scene into focus.

20. The combination with a camera, of means for defining upon a scene to be photographed the area of the scene which will be recorded by the camera and included within the framed exposure area of the camera film in sharp focus, said means comprising a source of light, means for projecting a beam of light from said source, means in the path of projection of the beam for reflecting the beam substantially along the optical axis of the camera toward said scene, lens means in the line of projection of said beam for illuminating the scene and for recording an image of the identical scene in said framed exposure area of the camera, a mask in the path of beam projection between said source and said scene illuminating lens means, said mask having an opening therein of a size and shape equal to said framed exposure area, means for adjusting along said path the distance between said mask and said scene illuminating lens means to make it equal to the distance between the framed exposure area and the image recording lens means when in sharp focus with said scene, thereby to project on to said scene an image shaped and focussed to define by illumination the exact area of the scene which will be recorded as an image within the framed exposure area of the camera film during photographing, and means for removing said reflecting means from the path of projection of said beam prior to photographing.

21. The combination with a camera, of means for defining upon a scene to be photographed the area of the scene which will be recorded by the camera and included within the film gate of the camera in sharp focus, said camera having an image forming means of selected size and position, said first mentioned means comprising a source of light, means for projecting a beam of light from said source, means for reflecting said beam substantially along the optical axis of the camera toward said scene, lens means in the path of projection of said beam, a mask in said path between said source and said lens means, said lens means for projecting the beam of light having the same focal length as the image forming means of the camera, said mask having an opening of the same size and shape as the film gate and positioned at the same distance from said lens means as the film gate is placed from the image forming means of the camera, means for adjusting along said beam, the distance between said mask and said lens means to bring said mask into the focal plane of the lens means in sharp focus with said scene, thereby to project an image on to the scene shaped to equal the film gate of the camera and focused on to the scene, and defining by illumination, an area thereof equal in size and outline to the area which will be included within the film gate of the camera during photographing, and means for removing said reflecting means from the path of projection of said beam prior to photographing.

22. The method of defining upon a scene to be photographed by a camera upon a photographic film therein the portion of said scene corresponding to the frame of exposure of said film, comprising directing a beam of light towards a photographic lens, having a focal length bearing a definite ratio to the focal length of the camera lens, shaping said beam at the focal plane of said lens to a shape similar to that of the frame of exposure of said film and with its linear dimensions bearing the same proportion to those of the said frame of exposure as the focal length of said lens bears to that of the camera lens and projecting said shaped beam by said lens upon said scene so as to fall thereupon on the optical axis of the camera.

23. The method of defining upon a scene to be photographed by a camera upon a photographic film therein the portion of said scene corresponding to the frame of exposure of said film, comprising directing a beam of light towards a lens having a focal length bearing a definite ratio to the focal length of the camera lens, shaping said beam at the focal plane of said lens to a shape similar to that of the frame of exposure of said film and with its linear dimensions bearing the same proportion to those of the said frame of exposure as the focal length of said lens bears to the camera lens and projecting said shaped beam by said lens upon said scene so as to fall thereupon on the optical axis of the camera, said projecting lens and the camera lens being positioned at the same distance from said scene as measured along said beam.

24. The method of defining upon a scene to be photographed by a camera upon a photographic film therein the portion of said scene corresponding to the frame of exposure of said film, comprising directing a beam of light towards a photographic lens, having a focal length bearing a definite ratio to the focal length of the camera lens, shaping said beam at the focal plane of said lens to a shape similar to that of the frame of exposure of said film and with its linear dimensions bearing the same proportion to those of the said frame of exposure as the focal length of said lens bears to the camera lens and projecting said shaped beam by said lens and reflecting it upon said scene along the optical axis of the camera, said projecting lens and the camera lens being positioned at the same distance from said scene as measured along said beam.

25. The method of defining upon a scene to be photographed an area thereof corresponding to the framed exposure area of a film contained within a camera, comprising shaping a beam of light to have the same shape as that of the frame of exposure area of the film and directing said shaped beam through a lens and projecting it on to the scene on the optical axis of the camera, the area of said beam at the plane of beam shaping being proportionate to the area of the frame of exposure of the film in the camera in accordance with the relative focal lengths of said lens and the camera lens.

26. The method of defining upon a scene to be photographed an area thereof corresponding to the framed exposure area of a film contained within a camera, comprising shaping a beam of light to have the same shape as that of the framed exposure area of the film and directing said shaped beam through a lens and projecting it on to the scene on the optical axis of the camera, the area of said beam at the plane of beam shaping being proportionate to the area of the frame of exposure of the film in the camera in accordance with the relative focal lengths of said lens and the camera lens, and both of said lenses being positioned equidistant from the scene.

27. The method of determining that portion of a scene to be photographed which will be included within the framed exposure area of a camera having a lens of predetermined focal length, said method comprising projecting a brightly illuminated image having an outline corresponding in shape to the outline of said framed exposure area of the camera film through a lens of a different focal length than that of the camera lens and focusing the projected image upon the scene to be photographed, the relative sizes of said illuminated image and the framed exposure area of the camera being proportionate to the relative focal lengths of the said two lenses.

28. The method of determining that portion of a scene to be photographed which will be included within the framed exposure area of a camera having a lens of predetermined focal length, said method comprising projecting a brightly illuminated image having an outline corresponding in shape to the outline of said framed exposure area of the camera film through a lens of a different focal length than that of the camera lens and focussing the projected image upon the scene to be photographed, the relative sizes of said illuminated image and the framed exposure area of the camera being proportionate to the relative focal lengths of the said two lenses and the said two lenses being positioned equidistant from the scene.

29. The combination with a camera of an apparatus for determining that portion of a scene to be photographed which will be included within the framed exposure area of a film in the camera, said apparatus comprising an objective lens system having a different focal length than that of the camera lens, means for projecting an image through said lens system upon the scene to be photographed on the optical axis of the camera, means for defining the margins of said image to make them correspond in shape to the margins of the framed exposure area of the camera film and with their linear dimensions corresponding proportionately to those of the framed exposure area of the camera film in accordance with the relative focal lengths of the said objective lens system and said camera lens, and means for focusing said image upon the scene to be photographed, said means comprising means for varying the distance between said lens system and said image.

30. The combination with a camera of an apparatus for determining that portion of a scene to be photographed which will be included within the framed exposure area of a film in the camera, said apparatus comprising an objective lens system having a different focal length than that of the camera lens, means for projecting an image through said lens system upon the scene to be photographed on the optical axis of the camera, means for defining the margins of said image to make them correspond in shape to the margins of the framed exposure area of the camera film and with their linear dimensions corresponding proportionately to those of the framed exposure area of the camera film in accordance with the relative focal lengths of the said objective lens system and said camera lens, means for focusing said image upon the scene to be photographed, said means comprising means for varying the distance between said lens system and said image, and means for positioning said lens system at the same distance from the scene as the camera lens.

31. The combination with the camera of an apparatus for determining that portion of a scene to be photographed which will be included within the framed exposure area of a film in the camera, said apparatus comprising an objective lens system having a different focal length than that of the camera lens, means for projecting an image through said lens system upon the scene to be photographed on the optical axis of the camera, means for defining the margins of said image to make them correspond in shape to the margins of the framed exposure area of the camera film and with their linear dimensions corresponding proportionately to those of the framed exposure area of the camera film in accordance with the relative focal lengths of the said objective lens system and said camera lens, means for focusing said image upon the scene to be photographed, said means comprising means for varying the distance between said lens system and said image, means for positioning said lens system at the same distance from the scene as the camera lens and means for rendering the image projecting means ineffective prior to the exposure of the film in the camera during the photographing operation.

32. A view finder comprising means for defining upon a scene to be photographed a portion of the scene which will be visioned by the optical system of a camera having a lens of predetermined focal length and which will be included in accurate focus within the framed exposure area of the camera film, said means comprising a mask having an aperture therein corresponding in shape to the framed exposure area of the film, a lens for projecting the image of said aperture toward the optical axis of the camera lens, reflecting means disposed across and at an angle to said axis and to the line of projection of the image and positioned to reflect the projected image along the optical axis of the camera towards the scene, said projecting lens having a focal length different than that of the focal length of the camera lens and the linear dimensions of said aperture corresponding proportionately to those of the framed exposure area of the camera film in accordance with the relative focal lengths of the camera lens and said projecting lens, said reflecting means being removable from the optical axis of the camera prior to photographing and means for positioning said projecting lens at the same distance from the scene, as measured along the line of projection, as the camera lens.

33. A view finder comprising means for defining upon the scene to be photographed the portion of the scene which will be visioned by the optical axis of a camera having a lens of predetermined focal length and which will be included in accurate focus within the framed exposure area of the camera film, said means comprising a projecting lens of different focal length than that of the camera lens and positioned at the same distance from the scene as the said camera lens, a mask positioned in the focal plane of said projecting lens and having an aperture therein conforming in shape to that of the framed exposure area of the camera film and having its linear dimensions corresponding proportionately to those of the framed exposure area of the camera film in accordance with the relative focal lengths of the camera lens and said projecting lens, means behind said mask for illuminating said aperture and means for directing the projected image of said aperture so as to fall upon the scene on the optical axis of the camera.

34. A view finder comprising means for defining upon the scene to be photographed the portion of the scene which will be visioned by the optical axis of a camera having a lens of predetermined focal length and which will be included in accurate focus within the framed exposure area of the camera film, said means comprising a projecting lens of different focal length than that of the camera lens, a mask positioned in the focal plane of said projecting lens and having an aperture therein conforming in shape to that of the framed exposure area of the camera film and having its linear dimensions corresponding proportionately to those of the framed exposure area of the camera film in accordance with the relative focal lengths of the camera lens and said projecting lens, means behind said mask for illuminating said aperture and means for directing the projected image of said aperture so as to fall upon the scene on the optical axis of the camera.

35. A view finder comprising means for defining upon the scene to be photographed the portion of the scene which will be visioned by the optical axis of a camera having a lens of predetermined focal length and which will be included in accurate focus within the framed exposure area of the camera film, said means comprising a projecting lens, a mask positioned in the focal plane of said projecting lens and having an aperture therein conforming in shape to that of the framed exposure area of the camera film and having its linear dimensions corresponding proportionately to those of the framed exposure area of the camera film in accordance with the relative focal lengths of the camera lens and said projecting lens, means behind said mask for illuminating said aperture and means for directing the projected image of said aperture so as to fall upon the scene on the optical axis of the camera.

36. The combination with a camera of an apparatus for determining that portion of a scene to be photographed which will be included within the framed exposure area of a film in the camera, said apparatus comprising an objective lens system, means for projecting an image through said lens system upon the scene to be photographed on the optical axis of the camera, means for defining the margins of said image to make them correspond in shape to the margins of the framed exposure area of the camera film and with their linear dimensions corresponding proportionately to those of the framed exposure area of the camera film in accordance with the relative focal lengths of the said objective lens system and said camera lens, and means for focusing said image upon the scene to be photographed, said means comprising means for varying the distance between said lens system and said image.

37. The method of defining upon a scene to be photographed an area thereof corresponding to the framed exposure area of a film contained within a camera, comprising shaping at a given plane a beam of light to have the same shape as the framed exposure area of the film and directing said shaped beam through a lens and projecting it on to the scene on the optical axis of the camera, the linear dimensions of said beam at the plane of beam shaping bearing the same proportion to those of the framed exposure area of the film as the distance of the plane of beam shaping from the lens through which said beam is projected bears to the distance of the plane of exposure of the film in the camera from the lens through which said film is exposed when said lens is in focus upon the scene.

38. The method of defining upon a scene to be photographed an area thereof corresponding to the framed exposure area of a film contained within a camera, comprising shaping at a given plane a beam of light to have the same shape as the framed exposure area of the film and directing said shaped beam through a lens and projecting it on to the scene on the optical axis of the camera, the linear dimensions of said beam at the plane of beam shaping bearing the same proportion to those of the framed exposure area of the film as the distance of the plane of beam shaping from the lens through which said beam is projected bears to the distance of the plane of exposure of the film in the camera from the lens through which said film is exposed when said lens is in focus upon the scene, the plane at which said shaped beam passes through the lens being the same distance from the scene as the plane of the lens through which said film is exposed, as measured along said beam.

39. The method of view finding with a camera having a definite field of vision for the lens of said camera, which comprises propagating and projecting a beam of light, shaping the margins of said beam to make them correspond in shape to the margins of said field of vision and directing said shaped beam through a lens upon the scene to be photographed substantially along the axis of the camera to illuminate the scene within the field of vision of the camera, thereby to define the same, the linear dimensions of the said margins of said beam at the plane of beam shaping bearing the same proportion to those of the field of vision at the focal plane of the camera lens as the distance of the plane of beam shaping from the lens through which it is directed bears to the distance of the focal plane of the camera lens from said camera lens.

40. The method of view finding with a camera having a definite field of vision for a definite focus, which comprises providing a beam of light having a cross-sectional area corresponding in shape to the cross-sectional area of the field of vision of the camera when focused on the scene, projecting said beam of light through a lens substantially along the optical axis of the camera, and thereby defining, by illumination, the field of vision of the camera, the size of the cross-sectional area of said beam at the plane of beam shaping bearing the same proportion to the size of the cross-sectional area of the field of vision of the camera as the distance of the plane of beam shaping from the lens through which the beam is projected bears to the definite focus of the camera.

MAX FLEISCHER.